3,388,199
PREPARATION OF ACRYLONITRILE-VINYL
ALCOHOL COPOLYMERS
David W. Chaney and William B. Black, Raleigh, N.C.,
assignors to Monsanto Company, St. Louis, Mo., a corporation of Delaware
No Drawing. Filed Mar. 15, 1965, Ser. No. 439,955
16 Claims. (Cl. 264—182)

ABSTRACT OF THE DISCLOSURE

A process for the preparation of acrylonitrile-vinyl alcohol copolymers is conducted by weak base hydrolysis of acrylonitrile-vinyl trihaloacetate copolymers. With trihaloacetates a weak hydrolysis agent may be used resulting in less degradation of the acrylonitrile units and resulting product improvement.

This invention relates to the preparation of copolymers of acrylonitrile and vinyl alcohol. More particularly, the invention is concerned with improved acrylonitrile-vinyl alcohol copolymers which are prepared by hydrolysis of acrylonitrile-vinyl trihaloacetate copolymers.

Both polyvinyl alcohol and acrylonitrile polymers have long been recognized as attractive polymers well suited for the production of fibers and filaments. In the past, acrylonitrile-vinyl alcohol copolymers have been made primarily from acrylonitrile-vinyl acetate copolymers. However, strong base is required to hydrolyze the vinyl acetate units which invariably results in harmful degradation of some of the acrylonitrile units. The polymers always become deep yellow to red brown as a result of the basic hydrolysis of the vinyl acetate copolymer. The vinyl acetate copolymer can also be hydrolyzed by strong acids, but this likewise results in destructive degradation of some of the acrylonitrile units. Weak bases are not satisfactory for the hydrolysis of polyvinyl acetate or vinyl acetate units in copolymers of vinyl acetate and acrylonitrile.

It is an object of the present invention to provide a process for the preparation of acrylonitrile-vinyl alcohol copolymers by hydrolysis of acrylonitrile-vinyl trihaloacetate copolymers using nitrogen bases such as ammonium hydroxide for the hydrolysis.

Another object of the invention is to prepared acrylonitrile-vinyl alcohol copolymers which are superior to any produced in the prior art.

An additional object is the preparation of fibers, filaments, films and other shaped articles from acrylonitrile-vinyl alcohol copolymers.

Other objects and advantages of the invention will become apparent from the description which follows.

These and other objects of the invention are accomplished by preparing an acrylonitrile-vinyl trihaloacetate copolymer. Preparation of such copolymers may follow prior art teachings for the preparation of vinyl polymers in general. The copolymer is extruded or spun to produce fibers, filaments and films which are then subjected to the hydrolysis step to produce the acrylonitrile-vinyl alcohol products. Alternatively, the copolymer may be hydrolyzed prior to spinning.

The term hydrolysis as used herein means any process by which the vinyl trihaloacetate until in the copolymer is cleaved in such a way as to yield a vinyl alcohol unit as indicated subsequently. Thus, the term embraces processes such as ammonolysis. The hydrolysis reaction may be illustrated as follows,

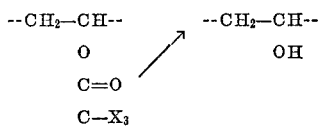

where X is a halogen.

The preparation of the acrylonitrile-vinyl trihaloacetate copolymers may be conducted by any convenient well known vinyl polymerazation precedure. Mass polymerization methods, solution polymerization methods, and other non-aqueous procedures may be used. The preferred practice utilizes solution polymerization wherein the polymer is prepared in finely divided form for immediate use in the fiber fabrication operations. Batch, semi-continous, continuous or any preferred procedure may be utilized.

The ratio of the two components of the copolymer may vary considerably. In general, the acrylonitrile component consists of from 80 to 99 percent by weight of the copolymer and the vinyl trihaloacetate component will then comprise from one to twenty percent of the copolymer by weight. Preferred copolymer compositions are those in which the acrylonitrile content is from 85 to 98 percent of the copolymer.

Suitable vinyl trihaloacetates include vinyl trifluoroacetate, vinyl chlorodifluoroacetate, vinyl fluorodichloroacetate, vinyl trichloroacetate, vinyl bromodifluoroacetate, vinyl bromodichloroacetate, and the like, vinyl trifluoroacetate and vinyl chlorodifluoroacetate are preferred.

The spinning of the acrylonitrile-vinyl trihaloacetate copolymers may be accomplished by any of the well known wet or dry spinning methods. Any convenient solvent that will successfully dissolve the copolymer is suitable for use in the spinning process. Useful solvents include dimethylformamide, dimethylacetamide and other N,N'-dialkyl acetamides and formamides, dimethyl sulfoxide and similar solvents. In a preferred wet spinning process, the coagulating bath can be any liquid which is a coagulant or is miscible with the solvent employed in the spinning solution, but is a non-solvent for the polymer. Both polar and non-polar liquids may be employed, but polar ones are preferred such as water and water-solvent mixtures.

Immediately after coagulation the fiber is hydrolyzed on the first godet after it emerges from the coagulation bath. The hydrolysis agent is placed in a pan or other suitable container under the first godet so that the fibers pass through the hydrolysis solution as they are rotated on the first godet. After hydrolysis the fibers are subjected to a hot stretch to orient the polymer molecules.

The hydrolysis reaction usually requires about 1 to 5 minutes, preferably 1 to 2 minutes. The hydrolysis agent may be present in the bath solution in an amount as little as 2 percent by weight.

The hydrolysis agent can be a primary or secondary amine or an aqueous or alcoholic solution of any amine base with a pKb value less than 8 but no less than 2.5;

if the pKb value is less than 2.5 some of the acrylonitrile units will be altered concurrent with the conversion of the acetate units to alcohol units. Useful bases include ammonium hydroxide, methanolic ammonia, primary amines such as methylamine, ethylamine, propylamine, butylamine, secondary amines such as piperidine, dimethylamine, diethylamine, dipropylamine, dibutylamine, methyl ethylamine and tertiary amines such as trimethylamine, triethylamine and tributylamine. In the case of tertiary amines it is necessary to have a proton donating agent such as water or an alcohol present to effect the conversion although some water will normally be present as a carryover from the coagulation bath.

The acrylonitrile-vinyl alcohol copolymers of the invention find utility in a wide range of uses to which both vinyl alcohol and acrylonitrile polymers, copolymers and blends are suitable. The copolymers of the invention are well suited for all general textile end uses, fibers, filaments, films and other shaped articles.

The invention is further illustrated by the following examples which are presented for illustrative purposes only and are not to be considered restrictive of the invention. In the examples all percentages are given on a total solution weight basis unless otherwise indicated.

Example I

Copolymers of vinyl trifluoroacetate and acrylonitrile were prepared as follows. The each of two heavy walled Pyrex bottles of approximately 250 ml. capacity was added 16.8 grams (0.12 mole) of vinyl trifluoroacetate, 31.8 grams (0.6 mole) of acrylonitrile, 0.24 gram of azobisisobutyronitrile and 120 ml. of cyclohexane. The monomers had been distilled and were free of added inhibitors. The bottles were sealed and shaken in a 50° C. bath for 16 hours. The contents of each bottle were stirred with 300 ml. of cyclohexane. The resulting polymers were filtered, washed with cyclohexane and dried under vacuum. Polymer A weighed 30.1 grams, 61.9 percent of the theoretical amount; polymer B weighed 29.9 grams, 61.5 percent of the theoretical amount. Polymer A contained 24.71 percent nitrogen corresponding to 93.6 weight percent acrylonitrile in the copolymer. Polymer B contained 24.83 percent nitrogen corresponding to 94.0 weight percent acrylonitrile in the copolymer. The specific viscosities at a concentration of 0.1 gram polymer in 100 ml. of dimethylformamide were measured at 25° C. The specific viscosities for A and B were 0.227 and 0.195 respectively.

Equal amounts of copolymers A and B were mixed. A 20 weight percent solution of the polymer in dimethylformamide was prepared by making a slurry of 55.0 grams of the polymer in 220 grams of dimethylformamide at −10° C. The mixture was gradually warmed to 80° C. to effect solution. The solution was wet spun using a 100 hole, 3½ mil jet, and a coagulation bath containing equal parts of dimethylformamide and water at 50° C. Four samples of fiber were prepared with samples 3 and 4 being hydrolyzed with 28 percent aqueous ammonium hydroxide while wrapped on a godet partly immersed in the hydrolysis solution. The temperature of the ammonium hydroxide was 10° C. to 15° C. and the fibers were in contact with the ammonium hydroxide for 4.6 minutes. A finish was applied to Sample 3.

Infrared spectra were obtained on the untreated and the ammonium hydroxide treated fibers (Samples 2 and 3 respectively). The spectrum of No. 2 had a band at 5.6 microns due to the carbonyl of the vinyl trifluoroacetate portion of the copolymer. The spectrum of No. 3, the hydrolyzed fiber, showed no appreciable absorption at 5.6 microns showing that the vinyl trifluoroacetate units of the copolymer were essentially completely converted to vinyl alcohol units.

The following fiber properties were obtained on the four samples. They were measured with an IP-4 tester on an unannealed fiber.

| Sample No. | Denier per filament | Tenacity/g./d. | Elongation, percent |
|---|---|---|---|
| (1) No hydrolysis, no finish | 2.64 | 3.23 | 18.5 |
| (2) No hydrolysis, finish | 2.66 | 3.16 | 19 |
| (3) Hydrolyzed, finish | 2.58 | 3.34 | 19 |
| (4) Hydrolyzed, no finish | 2.54 | 3.40 | 19 |

The hydrolyzed fiber had a whiteness value comparable to that of the unhydrolyzed fiber.

Example II

Following the same general procedures for preparation as used in Example I a copolymer was prepared using the following amounts of materials: 28 grams (0.2 mole) of vinyl trifluoroacetate, 21.2 grams (0.4 mole) of acrylonitrile, 0.25 gram of azobisisobutyronitrile and 120 ml. of cyclohexane. The yield of polymer was 18.9 grams, 38.5 percent of the theoretical amount. The copolymer contained 23.17 percent nitrogen corresponding to 87.8 weight percent acrylonitrile.

Films with a thickness of approximately 1 mil when dried were cast from a dimethylformamide solution of the polymer. The films were treated for 2, 5, and 15 minutes with each of the following solutions: concentrated aqueous ammonium hydroxide (28 percent ammonium hydroxide), piperidine and water, 25 parts to 75 parts by volume respectively, and triethylamine and water, 25 to 75 parts by volume respectively. The films were washed for 1 minute in water immediately after the base treatment and vacuum dried. Infrared examination indicated that hydrolysis was largely complete in 2 minutes in each case.

Example III

A mixture of 21.3 grams (0.4 mole) of acrylonitrile and 15.7 grams (0.1 mole) of vinyl chlorofluoroacetate was added to 100 ml. of n-heptane in a 500 ml. 3-neck flask fitted with reflux condenser and inlet for a nitrogen sweep and a mechanical stirrer. To the mixture was added 0.41 gram of azobisisobutyronitrile. The mixture was heated to 50° C. After the first half hour the mixture turned cloudy and after 3 hours was a white mush. After 5 hours reaction time the mixture was put into cyclohexane. The polymer was filtered and dried in vacuum. The yield was 8 grams, 22 percent of the theoretical amount.

An infrared spectrum of the copolymer had a very strong absorption band at 5.6 microns due to the carbonyls of the chlorodifluoroacetyl groups in the copolymer and a strong, sharp absorption at 4.47 microns due to the nitrile groups of the acrylonitrile portion of the copolymers.

Films of approximately 1 mil thickness when dry were cast from a dimethylformamide solution of the acrylonitrile vinyl chlorodifluoroacetate copolymer. An infrared spectrum showed an absorption band at 5.6 microns due to the carbonyls of the vinyl chlorodifluoroacetate units in the copolymer. Films were hydrolyzed for 2, 5 and 15 minutes in concentrated ammonium hydroxide. Infrared spectra of these films showed that the chlorodifluoroacetyl groups were largely hydrolyzed by the 2 minute hydrolysis and almost completely hydrolyzed by the 15 minute treatment. This indicates that rapid hydrolysis of the vinyl chlorodifluoroacetate acrylonitrile copolymer had occurred.

Example IV

A copolymer of vinyl trifluoroacetate in acrylonitrile was prepared in the following manner. To a Pyrex tube of 40 ml. capacity was added 5.3 grams (0.1 mole) of uninhibited acrylonitrile, 1.4 grams (0.01 mole) of vinyl trifluoroacetate, 20 ml. of cyclohexane and 0.034 gram of azobisisobutyronitrile. The tube was sealed, and rotated in a 50° C. water bath for 20 hours. Cyclohexane was added to the reaction mixture and the polymer was recovered by filtration. The yield was 2.0 grams, 30 percent of theoretical amount. The polymer contained 26.1 percent nitrogen, indicating an acrylonitrile content of 98.6 percent. The specific viscosity of a solution of 0.1 gram copolymer in 100 ml. of dimethylformamide at 25° C. was 0.265.

Films of approximately 1 mil thickness were cast from the dimethyl-formamide solution. An infrared spectrum of the film showed a band at 5.6 microns due to the carbonyls of the vinyl trifluoroacetate units of the copolymer. Similar films were hydrolyzed for 2 and 5 minutes in concentrated ammonium hydroxide. The infrared spectrum of film hydrolyzed 5 minutes showed the trifluoroacetate units had been hydrolyzed essentially to completion. The 2 minute hydrolysis resulted in hydrolysis of about 70 percent of the trifluoroacetate units.

Following the procedures outlined in the examples other acrylonitrile-vinyl trihaloacetate copolymers may be hydrolyzed with primary or secondary amines with comparable results.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

We claim:
1. A process for the preparation of acrylonitrile-vinyl alcohol copolymers comprising the steps of:
    (1) copolymerizing acrylonitrile with a vinyl trihaloacetate monomer to produce an acrylonitrile-vinyl trihaloacetate copolymer;
    (2) and subjecting the acrylonitrile-vinyl trihaloacetate copolymer to the action of an hydrolysis agent which has a pKb value of from 2.5 to 8 to produce an acrylonitrile-vinyl alcohol copolymer.
2. A process for the preparation of acrylonitrile-vinyl alcohol copolymer fibers comprising the steps of:
    (1) dissolving an acrylonitrile-vinyl trihaloacetate copolymer in an organic vinyl polymer solvent to form a solution;
    (2) extruding the solution through a suitable extrusion orifice into a coagulation medium to form an acrylonitrile-vinyl trihaloacetate copolymer fiber;
    (3) and hydrolyzing the fiber with an hydrolysis agent which has a pKb value of from 2.5 to 8 to produce an acrylonitrile-vinyl alcohol copolymer fiber.
3. A process for the preparation of acrylonitrile-vinyl alcohol copolymer fibers, comprising the steps of:
    (1) dissolving an acrylonitrile-vinyl trihaloacetate copolymer consisting of about 80 to 99 percent acrylonitrile and from about 1 to 20 percent of a vinyl trihaloacetate in an organic vinyl polymer solvent to form a solution;
    (2) extruding the solution through a suitable extrusion orifice into a coagulation medium to form an acrylonitrile-vinyl trihaloacetate copolymer fiber;
    (3) and hydrolyzing the fiber with an hydrolysis agent which has a pKb value of from 2.5 to 8 to produce an acrylonitrile-vinyl alcohol copolymer fiber.
4. A process for the preparation of acrylonitrile-vinyl alcohol copolymer fibers, comprising the steps of:
    (1) dissolving an acrylonitrile-vinyl trifluoroacetate copolymer containing from 85 to 98 percent acrylonitrile and from 2 to 15 percent vinyl trifluoroacetate in dimethylformamide to form a solution;
    (2) extruding the solution through a suitable extrusion orifice into a liquid coagulation bath comprising at least 50 percent water to form an acrylonitrile-vinyl trifluoroacetate copolymer fiber containing from 85 to 98 percent acrylonitrile and from 2 to 15 percent vinyl trifluoroacetate;
    (3) and hydrolyzing the fiber with an hydrolysis agent which has a pKb value of from 2.5 to 8 to produce an acrylonitrile-vinyl alcohol copolymer fiber.
5. A process for the preparation of acrylonitrile-vinyl alcohol copolymer films comprising the steps of:
    (1) dissolving an acrylonitrile-vinyl trihaloacetate copolymer in an organic vinyl polymer solvent to form a solution;
    (2) casting a film from the solution;
    (3) and hydrolyzing the film with an hydrolysis agent which has a pKb value of from 2.5 to 8 to produce an acrylonitrile-vinyl alcohol copolymer film.
6. The process of claim 1 wherein the vinyl trihaloacetate is vinyl chlorodifluoroacetate.
7. The process of claim 1 wherein the vinyl trihaloacetate is vinyl dichlorofluoroacetate.
8. The process of claim 1 wherein the vinyl trihaloacetate is vinyl trichloroacetate.
9. The process of claim 1 wherein the vinyl trihaloacetate is vinyl trifluoroacetate.
10. The process of claim 1 wherein the organic vinyl polymer solvent is dimethylacetamide.
11. The process of claim 1 wherein the organic vinyl polymer solvent is dimethylsulfoxide.
12. The process of claim 1 wherein the organic vinyl polymer solvent is dimethylformamide.
13. The process of claim 1 wherein the hydrolysis is by means of ammonium hydroxide.
14. The process of claim 1 wherein the hydrolysis is by means of a solution of a tertiary amine and a proton donating agent.
15. The process of claim 1 wherein the hydrolysis is by means of a secondary amine.
16. The process of claim 1 wherein the hydrolysis is by means of a primary amine.

References Cited
UNITED STATES PATENTS

| | | | |
|---|---|---|---|
| 2,649,427 | 8/1953 | Marvel. | |
| 3,099,517 | 7/1963 | Hurley et al. | 264—182 |
| 3,329,754 | 7/1967 | Black | 264—185 |

JAMES A. SEIDLECK, *Primary Examiner.*

DONALD J. ARNOLD, *Examiner.*

H. H. MINTZ, *Assistant Examiner.*